Figure 1:
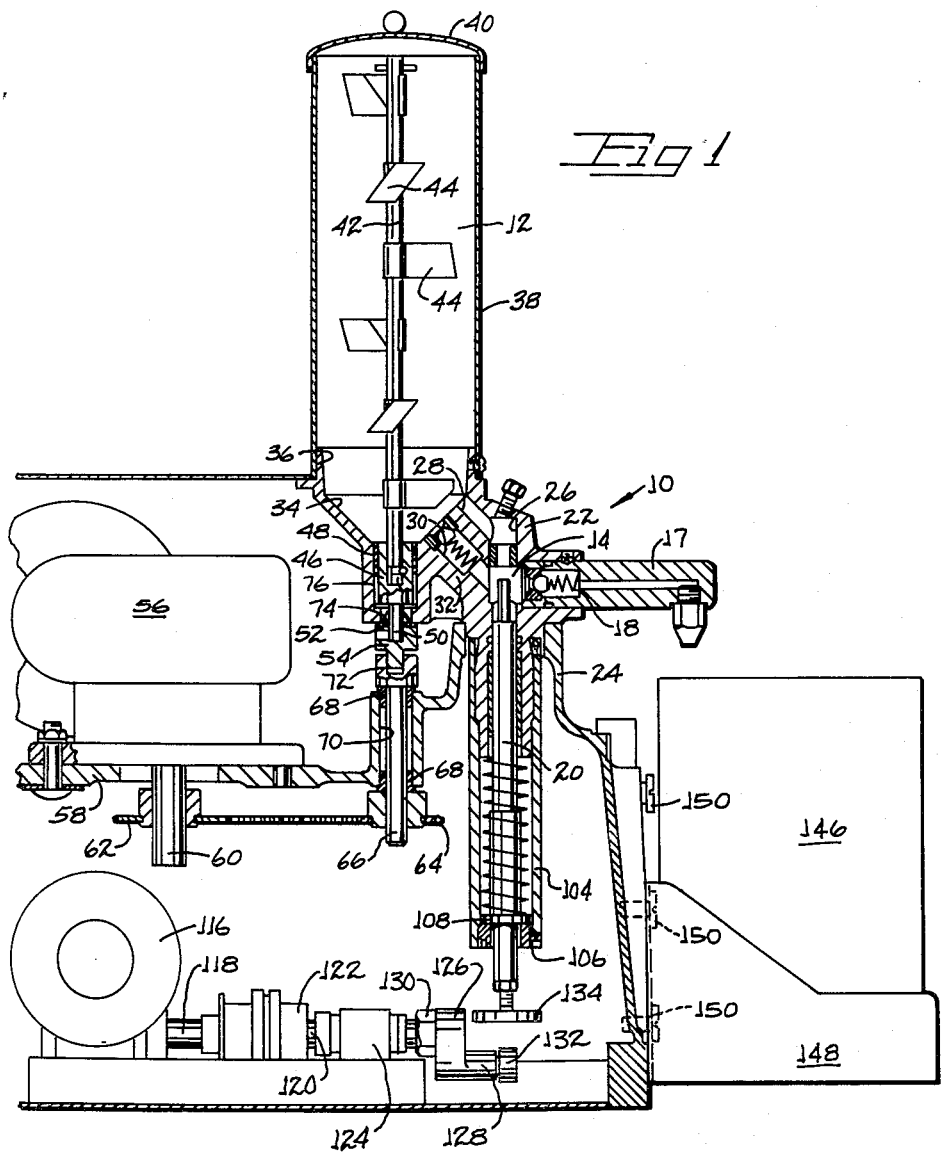

March 6, 1962 L. MARSH ETAL 3,023,936
DISPENSING PUMP WITH VENTING MEANS
Filed June 26, 1959 3 Sheets-Sheet 3
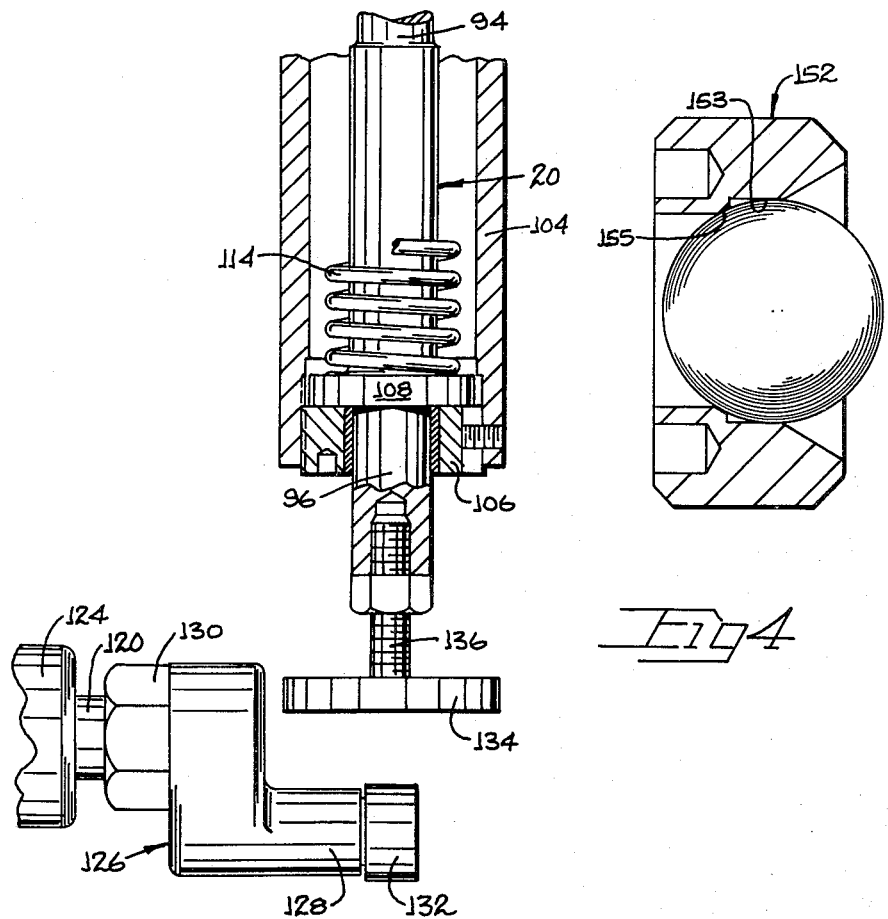
INVENTOR.
*LYLE MARSH*
BY *GABRIEL MALKIN*
*WILSON, LEWIS & McRAE*

United States Patent Office 3,023,936
Patented Mar. 6, 1962

3,023,936
DISPENSING PUMP WITH VENTING MEANS
Lyle Marsh, St. Clair Shores, Mich., and Gabriel Malkin, Westfield, N.J., assignors to Marien Metal Products Co., Hazel Park, Mich., a corporation of Michigan, and Benjamin Moore & Co., New York, N.Y., a corporation of New Jersey
Filed June 26, 1959, Ser. No. 823,053
6 Claims. (Cl. 222—235)

This invention relates to a liquid dispensing pump and more particularly, to a pump for accurately dispensing measured quantities of either a free-flowing or very viscous liquid.

The dispenser of the present invention is particularly adapted for use in dispensing the base colorants used in the preparation of mixed-to-order coating compositions. The base colorants used in such coating compositions consist of pigment mixed with sufficient vehicle to form a flowable mass. The liquid mixture may be termed "viscous." It should be noted at this point that while the dispenser is described in relation to the dispensing of colorants, it will be appreciated that it is also operable to dispense a variety of liquids, such, for example, as liquid or semi-liquid food products, lubricating oils or various other products having a paste-like consistency.

Mixed-to-order paints are prepared on the spot by paint retailers to supply each customer's individual requirement. Mixed-to-order paints make available a wide variety of standardized and special colors and hues, in comparison to the limited range of pre-mixed colors available from paint manufacturers, and at the same time permit the retailer to inventory only a small number of different base colorants. The advantages of this method of paint retailing have created a strong demand for devices capable of efficiently dispensing base colorants.

Various attempts have heretofore been made to provide a dispensing apparatus suitable for use in retail outlets. The devices heretofore proposed have been generally complex, cumbersome and expensive and have not overcome certain problems inherent in paint mixing. In order to produce and reproduce the exact hues desired, it is necessary that the dispensing device be extremely accurate. A small error in the amount of colorant dispensed may result in an appreciable deviation between the actual paint mixed and the color desired. The device should also be adjustable to dispense either a small or a large amount of a specific colorant. For example, it should be able to dispense as little as 1/200 of an ounce or as much as 8 ounces, depending upon the requirement of the particular paint being formulated. Furthermore, whatever quantity is dispensed must be measured with an extremely high degree of accuracy at each end of the range. Additionally, the dispenser should be of rugged and long lasting construction and should be inexpensive to manufacture. It is also desirable that the dispenser not have objectional dripping of colorant after the dispensing operation which would create a clean-up problem.

Accordingly, it is an object of this invention to provide a liquid dispensing pump for accurately dispensing a predetermined amount of liquid upon each actuation thereof.

Another object of this invention is to provide means for varying the predetermined amount dispensed in accordance with varying requirements.

A still further object of this invention is to provide a pump which is "drip free" after each dispensing operation.

An additional object is the provision in the dispenser of storage means to carry a quantity of the liquid to be dispensed and to provide agitator means to keep the stored liquid in a well-mixed condition.

Another object of the invention is to provide means to prime the pump to insure that no air is entrapped in the metering chamber.

A still further object of the invention is to provide a spout for the pump which will retain a predetermined amount of liquid therein after each dispensing cycle and which will prevent the retained liquid from dripping from the spout.

Another object of the invention is to provide a simplified pump structure which is rugged in construction and durable in use.

Other objects of this invention will appear in the following description and appended claims, reference being had to the accompanying drawings forming a part of this specification wherein like reference characters designate corresponding parts in the several views.

Figure 2:
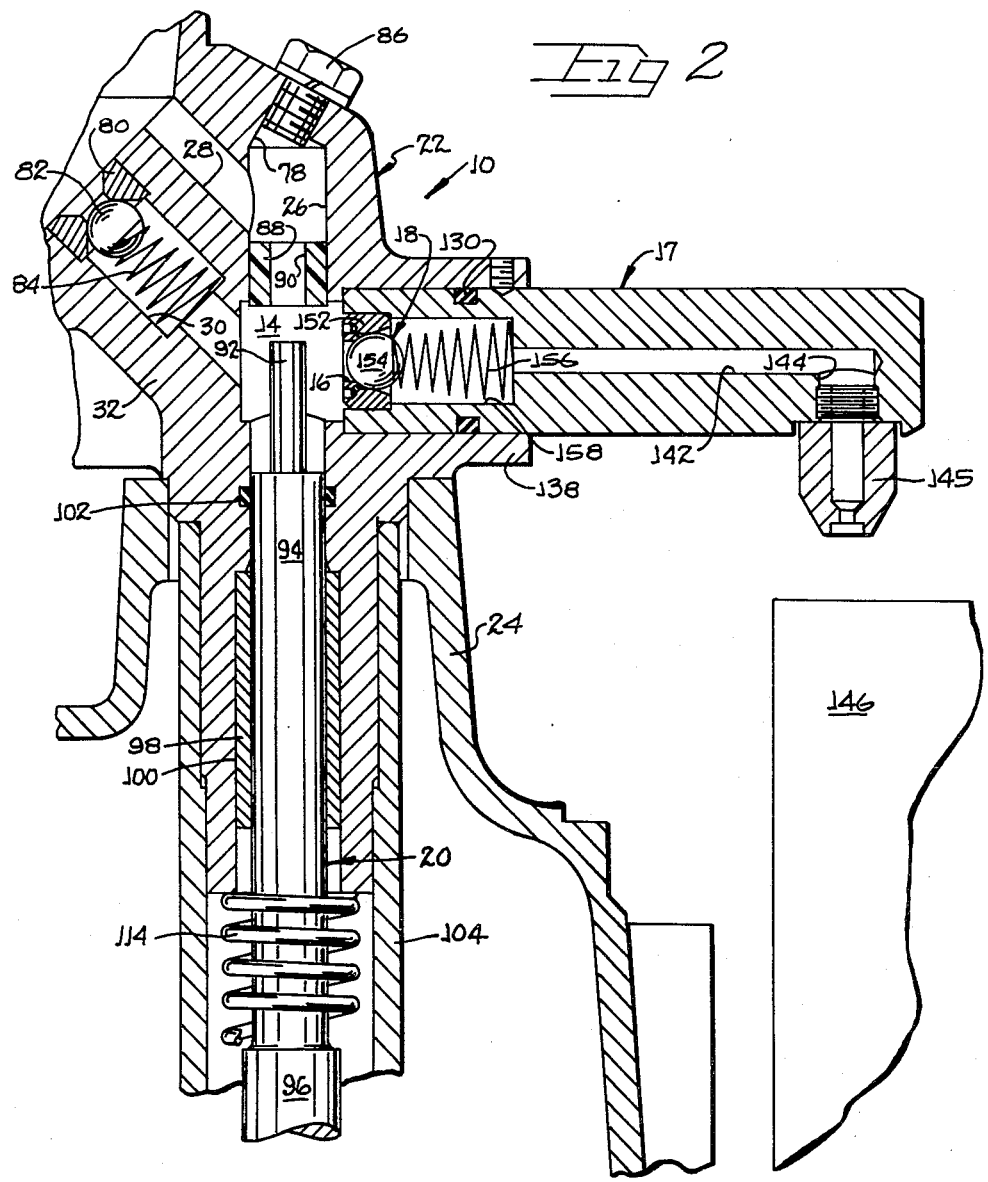

In the drawings:
FIG. 1 is an elevational view of one embodiment of the present invention in section;
FIG. 2 is an enlarged sectional view of the metering portion of the pump of FIG. 1;
FIG. 3 is an enlarged sectional view of the lower portion of the FIG. 1 embodiment showing the drive means for the pump plunger;
FIG. 4 is an enlarged sectional view of the spout check valve structure of FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Broadly, the liquid dispensing pump 10 of the present invention comprises a liquid storage chamber or reservoir 12 in fluid communication with a metering chamber 14. The chamber 14 is provided with an outlet opening 16 having a spout 17 which is normally releasably closed by check valve means 18. A cyclically operated multi-stroke plunger 20 is provided for insertion into the metering chamber 14. The plunger 20 is operable on one stroke to first close the chamber 14 to the reservoir 12 and to trap a metered quantity of liquid within the chamber and then to displace and expel a predetermined quantity of the trapped fluid through the outlet 16. The plunger 20 is operable on the return stroke to open the chamber 14 and permit liquid to feed from the reservoir 12 to fill chamber 14 for the next dispensing cycle.

Referring more specifically to FIG. 1, the pump casing 22 is supported within a dispenser housing structure 24. The casing 22 is formed with a vertical axial passageway 26 a portion of which defines the metering chamber 14. Extending into the upper portion of the passageway 26 are a pair of spaced downwardly inclined lateral passageways 28, 30 formed in an angular projecting portion 32 of the pump casing. The passageways 28, 30 each act as fluid inlets to the metering chamber 14 and in addition serve in a special cooperating function when the pump is primed as will be hereinafter more fully explained. The projecting portion 32 is provided with a conically shaped well portion 34 which forms part of the fluid reservoir 12. The upper rim of the well 34 is provided with an upstanding peripheral flange 36 to receive an open-ended tube 38 which cooperates with the well 34 to form the reservoir 12. A removable lid 40 is provided on the upper end of the tube 38.

Positioned within the reservoir 12 are agitator means for keeping the liquid stored therein in a well-mixed condition. The agitator comprises a vertical shaft 42 extending axially through the reservoir 12. Secured to the shaft 42 are a plurality of vertically spaced blades 44 to give a stirring action when the shaft is rotated. It is not necessary to continuously stir the liquid. Normally, it is stirred just prior to a dispensing operation to insure free flow into the pump.

The agitator means is rotatably driven by means of a motor 56 having a suitable power transmission connection to the lower end of the shaft 42. The motor 56 is mounted on a platform 58 which forms an integral part of the housing structure 24. Extending downwardly from the motor 56 is the output shaft 60 which carries a chain sprocket 62 at the lower end thereof. The sprocks 62 is drivingly connected to a second sprocket 64 carried on the lower end of a sprocket shaft 66. The shaft 66 is journalled in suitable bearings 68 mounted in a bore 70 extending upwardly from the motor platform 58. The sprocket shaft is drivingly connected with the agitator shaft 42 by means of a female adapter 72 which meshes with a male adapter 54 carried on the lower end of stub shaft 50. The shaft 50 extends through an opening 52 provided in the bottom of the well 34 and is secured to the agitator shaft 42 by means of a connector 46. The connector 46 is journalled in the bore 76 by means of suitable bearings 48. The opening 52 is provided with an oil seal 74 to prevent leakage of liquid from the reservoir 12.

As previously mentioned, the inlet passageways 28, 30 are utilized to function cooperatively to prime the pump. The purpose of priming the pump is to ensure that metering chamber 14 and associated passageways are completely filled before pump operation. This requires the prevention of air entrapment in the metering chamber and associated passageways. Such entrapped air would lead to inaccuracies in the amount of liquid dispensed on each cycle.

The priming step involves the passageways 28, 30 and a priming opening 78. As may be noted, the passageway 30 is normally closed by means of a check valve comprising a valve seat 80, a spherical valve element 82 and a spring 84 which constantly urges the element 82 to seat in the valve seat 80. At one point in the priming operation, it is necessary to open the check valve and to close the upper passageway 28. A useful tool for this purpose is a rod having at its lower end a pair of spaced fingers for insertion into the passageways 28, 30. Such a rod may be conveniently inserted into the reservoir 12 through the upper end thereof. One finger will be of sufficient size to block the passageway 28 while the other will be small enough to be inserted into the passageway 30 to push the ball 82 out of the way but not block the passageway 30 to the flow of fluid.

There are two alternate methods for priming the pump. One method consists of first removing the primer plug 86, then manually depressing the valve element 82 to open the passageway 30, and blocking the passageway 28 which may be done with a tool as described. Fluid may then be delivered to the metering chamber 14 through the priming opening 78. As the level of liquid rises, any air which is trapped in the metering chamber 14 is forced out through the passageway 30. When the level of liquid has risen above the metering chamber 14 and passageway 28, the valve element 82 may be released to close the passageway 30 and the passageway 28 may be unblocked. Continuing the rise in the fluid level forces any air in the upper portion of the passageway 26 out through the passageway 28. It is desirable to fill the pump to the uppermost point in the priming opening 78 so that when the threaded plug 86 is screwed into the opening it will immediately contact liquid without entrapping any air at that point.

The alternative method of pump priming, which is essentially the reverse of the above-described method, is to deliver fluid through priming opening 78 before the passageway 28 is blocked and the passageway 30 is opened. Using this technique, the upper portion of the passageway 26 and the passageway 28 are first filled without the entrapment of air. After this has been accomplished, the passageway 28 is blocked and the passageway 30 opened as previously described. Continued pouring through the opening 78 will then cause the passageway 30 and metering chamber 14 to be filled.

Wall means are provided to extend across the passageway 26 to define the metering chamber 14. The wall means comprise a bushing 88 having a central opening 90. During the dispensing cycle of the pump, the opening 90 is closed by a valve element 92 carried by the plunger 20 whereby a quantity of liquid is trapped in the metering chamber 14. A portion of the trapped liquid is subsequently dispensed through the outlet 16.

The plunger 20 is a generally cylindrical rod element comprising at its upper end a first reduced diameter portion which forms the valve element 92, followed by intermediate portion 94 of increased diameter which forms the fluid-displacing element, and terminating at its lower end in a portion 96. The intermediate portion 94 is journalled by means of suitable bearings 98 in a bore 100 provided in casing 22. An oil seal such as an O-ring 102 is provided in the bore 100 adjacent the metering chamber 14 to prevent leakage from the chamber. The plunger 20 is surrounded by a sleeve 104 which is secured at its upper end to the casing 22. The lower end of the sleeve 104 is provided with bearings 106 in which is journalled the lower end 96 of the plunger. A collar 108 is provided adjacent the lower end of the plunger to act as a stop member to limit the downward stroke of the plunger. The collar 108 also acts as a guide member to maintain the plunger in axial alignment.

The plunger is vertically reciprocated by means of a compression spring 114 and a motor 116. The spring 114 is provided in the sleeve 104 with its upper end abutting against the casing 22 and its lower end abutting against the collar 108. The spring 114 constantly urges the plunger toward its lowermost position. The plunger is driven on its upward stroke by means of a cam or crank arrangement rotatably driven by the motor 116. The output shaft 118 of the motor is coupled to a cam shaft 120 by means of a flexible coupling 122. The cam shaft is journalled in suitable bearings 124. Secured to the outer end of the cam shaft is a cam element 126 having an arm 128 projecting outwardly to a point beneath the plunger 20. The cam element 126 is locked in place on the shaft 120 by means of a jam nut 130. Secured to the outer end of the arm 128 is a rotatable cylindrical element 132. The element 132 is adapted to contact a cam follower plate 134, provided at the lower end of the plunger 20, and drive the plunger in its upward stroke. The cam follower plate is adjustably secured to the plunger 20 by means of a threaded stud 136. This permits the point of contact of the rotatable element 132 with the follower 134 to be adjusted by screwing the stud 136 in or out of the plunger. In this way the length of the plunger stroke may be varied.

In operation of the plunger drive system, the motor 116 rotates the cam element 126 causing the element 132 to contact the follower 134 and drive the plunger in an upward stroke. The element 132, will, of course, contact the follower 134 during a portion only of its circular path. When the plunger has reached the limit of its upward stroke the spring 114 urges it downwardly to its lower position to complete one dispensing cycle.

In operation, the upward stroke of the plunger 20 does not act to dispense liquid from the pump until the valve element 92 closes the opening 90. Prior to closing of the opening 90, fluid displaced by the plunger 20 will be forced through the opening 90 and back into the reservoir 12 since the check valve 18 will maintain the outlet 16 closed. After the opening 90 is sealed, continued upward movement of the plunger will operate to create sufficient pressure to open the check valve 18 and dispense fluid through the spout 17. A requirement of such displacement-type dispensing action is that after the opening 90 is closed, an increased volume of the plunger be introduced into the metering chamber. In the preferred embodiment shown, this is accomplished by providing the valve element 92 as a reduced section whereby as portions of the valve element slide through the bushing 88 and leave the metering chamber, a larger diameter portion 94 of the plunger enters the metering chamber to provide the necessary displacing volume. However, a similar action could be accomplished in other ways, for example by providing the valve element mounted on a compressible spring or as a telescoping element to slide into the upper portion of the plunger 20.

When the plunger ends its upward stroke, the pressure in the chamber 14 drops and the check valve 18 closes to discontinue dispensing of liquid through the opening 16. During the downward stroke, the valve element 92 creates a suction to draw liquid from the reservoir 12 through the passageway 28 to immediately fill the upper portion of the passageway 26. Simultaneously therewith, a suction is created in the chamber 14 to unseat the check valve element 82 and open the passageway 30 to begin refilling the chamber 14. When the element 92 passes entirely through the opening 90, fluid will be drawn through both or either of the passageways 28, 30 to fill the chamber 14. This arrangement provides a very rapid refill procedure to permit the pump to be driven at high speeds.

The outlet spout 17 is secured to an annular projection 138. An O-ring 130 is provided to prevent leakage of liquid around the spout. The spout has a central passageway 142 leading from the inner end to a point adjacent the outer end of the spout. A threaded vertical passageway 144 leads at right angles from the outer end of the passageway 142 to form the spout outlet. The outlet is provided with a nozzle 145 to direct the dispensed liquid into a paint container 146. The container 146 is supported by an adjustable shelf 148. The shelf 148 is secured by means of two of the screws 150 which threadingly engage openings in the housing 24. The shelf is provided as a vertically adjustable unit to compensate for different container sizes, such as quart or gallon, which may be filled from the dispenser.

The outlet check valve 18, which comprises a valve seat 152, spherical valve element 154, and conical spring 156 is mounted in an enlarged portion 158 of the passageway 142. In addition to releasably opening and closing the spout 17 to allow flow of liquid during each dispensing cycle, the check valve 18 operates to quickly cut off the flow of liquid from the spout after dispensing and also to prevent dripping of liquid thereafter. This is accomplished as a result of the suction which the spherical element 154 creates as it moves to close the opening 16. As may be noted in FIG. 4, the valve seat 152 is provided with a passageway 153, adjacent the annular seating surface 155, for the reception of the ball 154. The diameter of the passageway 153 is substantially equal to the major diameter of the ball 154, there being a slight clearance to permit ball movement. Movement of the ball through the passageway 153, towards the surface 155, creates the aforementioned suction. The suction is of sufficient magnitude to draw liquid remaining in the passageway 142 towards the outlet opening 16 thus providing a quick shut-off of flow from the pump. It is important to have the liquid drawn back from the spout in order to compensate for variations in room temperature which may cause thermal expansion with a consequent dripping of the trapped liquid. The distance which the liquid is withdrawn may be varied as desired by varying the length of the passageway 153 or the diameter of passageway 153 and ball 154.

The fluid is retained in the spout during non-dispensing periods either by the surface tension of the fluid or the differential pressure created by the suction. Due to the high viscosity and impermeability of most of the liquids dispensed from the pump, there is a high surface tension within the fluid and also a considerable length of time before air passes therethrough to equalize the pressure on both sides of the entrapped fluid.

In the event that the pump is to be used for a thin liquid, the spout may be inclined at a slight upward angle to retain fluid trapped therein.

The amount of fluid dispensed from the pump 10 is readily controlled by controlling the number of revolutions of the motor 116. A control mechanism (not shown) may be provided to selectively determine the number of revolutions of the motor per dispensing operation. While many different motors may be used for this purpose, the preferred type of motor for the pump is one similar to a Bodine Group 5 electric motor.

The dispensing device disclosed is, as may be readily appreciated, a relatively uncomplicated device. It is particularly characterized in its ability to deliver small quantities of liquid per stroke and yet maintain a high degree of accuracy over a large number of strokes. It is also rugged and capable of long usuage without failure.

Having thus described our invention, we claim:

1. A liquid dispenser comprising liquid storage means; means defining a liquid metering chamber; said metering chamber having first and second inlets and an outlet; said first and second inlets communicating with the storage means; check valve means releasably closing said outlet; a plunger opening in said metering chamber; a plunger slidably received in the plunger opening; wall means extending across the metering chamber and separating the first inlet opening from the outlet opening and the plunger opening; an opening in said wall means for the passage of fluid therethrough; the end of the plunger being of reduced cross-sectional area to form a valve element; said valve element being slidably receivable in the wall means opening to close said opening; and check valve means normally closing said second inlet; whereby the plunger is operable on one stroke to close the wall opening and trap a metered quantity of liquid in the metering chamber and subsequently displace and expel a predetermined quantity of liquid through the outlet and operable on the return stroke to create a suction to open the check valve means of the second opening and to draw liquid into the metering chamber.

2. A pump comprising a liquid reservoir; a casing including a metering chamber; said metering chamber having inlet means and outlet means; said inlet means comprising first and second openings communicating with the reservoir; check valve means releasably closing said outlet means; wall means extending across the metering chamber and separating the first inlet opening from the outlet opening; an opening in said wall means for the passage of fluid therethrough; check valve means normally closing the second inlet opening; reciprocal plunger means for insertion into said metering chamber; a valve element of reduced cross-sectional area carried by said plunger means; said valve elements being slidably receivable in the wall opening on one stroke to close said metering chamber to said liquid reservoir; and said plunger means operable on the same stroke to displace liquid from the metering chamber through the outlet and operable on the return stroke to create a suction to open the check valve means of the second inlet opening and to draw liquid into the metering chamber.

3. A liquid dispenser comprising liquid storage means; means defining a liquid metering chamber; said metering chamber having first and second inlets and an outlet; said storage means positioned above the metering chamber and communicating therewith via said inlets; check valve means releasably closing said outlet; a plunger opening in said metering chamber; a plunger including an extension slidably received in the plunger opening; wall means extending across the metering chamber and separating the first inlet opening from the outlet opening and the plunger opening; a valve means in said wall means for the passage of fluid therethrough; check valve means normally closing the second inlet; said extension carried by the plunger operable on one stroke to close said valve means in the wall means and trap a metered quantity of liquid in the metering chamber whereby the plunger is operable to subsequently displace and expel a predetermined quantity of liquid through the outlet and operable on the return stroke to create a suction to open the check valve means of the second inlet opening and to draw liquid into the metering chamber.

4. A device as claimed in claim 3 and further characterized in that agitator means are provided in said liquid storage means to maintain liquid contained therein in a well-mixed condition.

5. A liquid dispenser comprising liquid storage means; means defining a liquid metering chamber; said metering chamber having first and second inlets and an outlet; said first and second inlets communicating with the storage means; check valve means releasably closing said outlet; a plunger opening in said metering chamber; a plunger including an extension slidably received in the plunger opening; wall means extending across the metering chamber and separating the first inlet opening from the outlet opening and the plunger opening; a valve means in said wall means for the passage of fluid therethrough; check valve means normally closing the second inlet; said extension carried by the plunger operable to close said valve means in the wall means; whereby the plunger is operable on one stroke to close the wall means opening and trap a metered quantity of liquid in the metering chamber and subsequently displace and expel a predetermined quantity of liquid through the outlet and operable on the return stroke to create a suction to open the check valve means of the second inlet opening and to draw liquid into the metering chamber.

6. A device as claimed in claim 5 and further characterized in the provision of a priming opening into the metering chamber; closure means for the priming opening; said metering chamber being fillable, without the entrapment of air, through said priming opening with said second opening held open.

References Cited in the file of this patent

UNITED STATES PATENTS

| 1,881,963 | Perrin | Oct. 11, 1932 |
| 2,016,621 | Bernard | Oct. 8, 1935 |
| 2,155,887 | Bernhardt | Apr. 25, 1939 |
| 2,384,824 | Eitner | Sept. 18, 1945 |
| 2,413,916 | Hallead | Jan. 7, 1947 |
| 2,425,867 | Davis | Aug. 19, 1947 |
| 2,510,576 | Herbold | June 6, 1950 |
| 2,524,235 | Schenk | Oct. 3, 1950 |
| 2,605,036 | Cozzoli | July 29, 1952 |
| 2,705,093 | Carter | Mar. 29, 1955 |
| 2,779,506 | Gajda | Jan. 29, 1957 |
| 2,846,123 | Gray | Aug. 5, 1958 |
| 2,916,998 | Miller | Dec. 15, 1959 |

FOREIGN PATENTS

| 100,751 | Australia | Apr. 22, 1937 |
| 541,870 | Canada | June 4, 1957 |
| 1,066,118 | France | June 2, 1954 |